Figure 3:
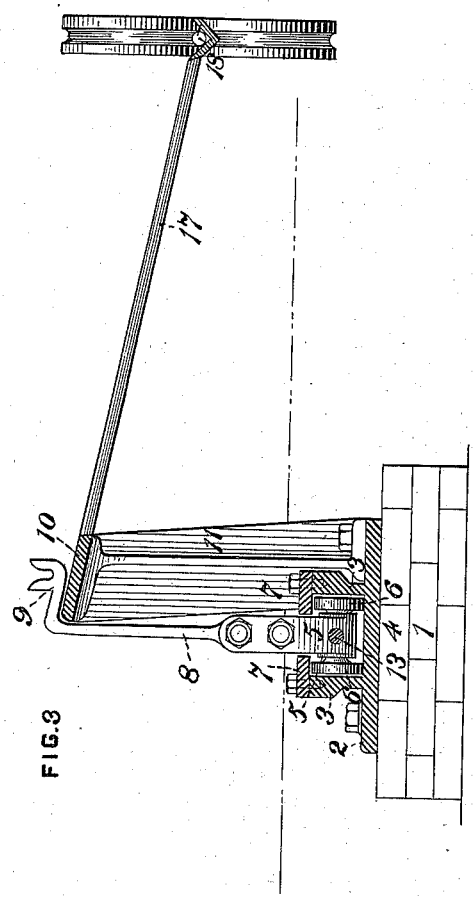

(No Model.) 2 Sheets—Sheet 1.
T. J. BRAY.
PIPE WELDING APPARATUS.
No. 382,452. Patented May 8, 1888.
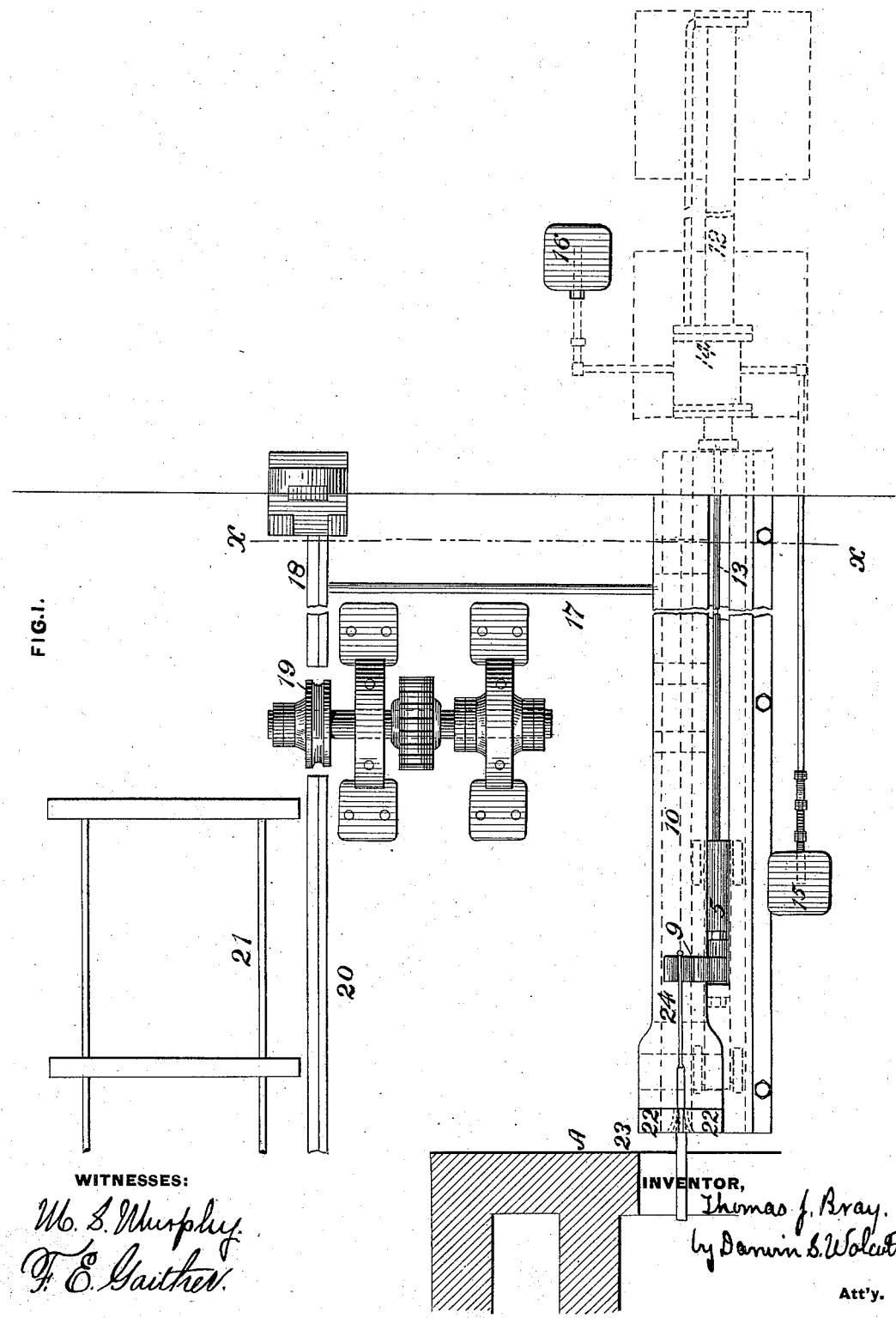
FIG.I.
WITNESSES:
M. S. Murphy.
F. E. Gaither.
INVENTOR,
Thomas J. Bray.
by Darwin S. Wolcott
Att'y.

(No Model.) 2 Sheets—Sheet 2.

T. J. BRAY.
PIPE WELDING APPARATUS.

No. 382,452. Patented May 8, 1888.

WITNESSES:
Mc. L. Murphy.
F. E. Gaither.

INVENTOR:
Thomas J. Bray.
by Danwin L. Wolcott
Att'y.

UNITED STATES PATENT OFFICE.

THOMAS J. BRAY, OF WHEELING, WEST VIRGINIA, ASSIGNOR OF ONE-HALF TO THE RIVERSIDE IRON WORKS, OF SAME PLACE.

PIPE-WELDING APPARATUS.

SPECIFICATION forming part of Letters Patent No. 382,452, dated May 8, 1888.

Application filed February 3, 1888. Serial No. 262,906. (No model.)

*To all whom it may concern:*

Be it known that I, THOMAS J. BRAY, a citizen of the United States, residing at Wheeling, in the county of Ohio and State of West Virginia, have invented or discovered a certain new and useful Improvement in Pipe-Welding Apparatus, of which improvement the following is a specification.

The invention herein relates to certain improvements in machinery for manufacturing wrought-iron pipes. In manufacturing what is known as "bell-die pipe" a piece of rod-iron about five feet long, and provided with a knob at one end, is welded to the sheet or strip of iron which is to be formed into a pipe or tube. The strip after being "tagged," as above stated, is placed in a suitable furnace, the tag serving as a handle therefor, and evenly heated throughout its entire length. As soon as a strip has been properly heated, the welder draws it opposite the draw-bench, and, slipping a "bell-die" over the "tag," hooks the latter onto a carriage or buggy having a forked piece to engage the knob on the end of the tag. This carriage or buggy is provided with a hook, which is caused to engage a link in a traveling endless chain as soon as the tag has been hooked to the buggy. This endless chain traverses the top of the draw-bench a distance somewhat greater than the length of the strips of iron. As the buggy is drawn along by the chain, the bell-die is pulled against the head-block, the motion of the die being arrested. The continued movement of the buggy will draw the strip through the die, and thereby bend and weld the same into pipe form. As soon as the buggy-runner has hooked the buggy to the endless chain, he runs along the draw-bench to opposite or rear end thereof, keeping pace with the buggy, so that he may disconnect the buggy from the chain as soon as a length of pipe has been formed. As soon as the buggy has been disconnected from the chain the tag is removed from the forks of the buggy, with which the buggy-runner immediately runs back to the front end of the draw-bench, so as to be ready for another pipe. Another draw-bench, similar in construction and operation, is arranged at the rear end of the first bench, and as soon as the operation just described has been completed a boy stationed at the front end of the second bench slips a bell-die, somewhat smaller than the bending and welding die, over the tag, and having hooked the tag to a buggy, the latter is attached to a second endless chain, whereby the pipe is drawn through the second die, by which the pipe is reduced to the desired diameter. As each of the draw-benches is about twenty-five feet long, the buggy-runners have to run about fifty feet for each pipe. This distance has to be traversed by each runner several times a minute, and as the exertion is very exhaustive, two gangs or sets of runners are necessary during ordinary weather; and in hot weather three gangs or sets, changing every fifteen or twenty minutes, are required. In addition to the large number of employés required, an expensive apparatus, consisting of shafting, gear and sprocket wheels, chains, buggies, &c., is necessary, and, further, the greater part of this apparatus is arranged underground, and therefore difficult of access for repairs, &c.

The object of the invention herein is to provide such a construction and arrangement of devices as will obviate the necessity of employing so large a number of employés in such exhaustive labor and the location of complicated machinery where it is not readily accessible; and it is a further object of my invention to facilitate the manufacture of pipe by rendering the apparatus more nearly automatic in its action.

To these ends the invention consists in the construction and combination of mechanical devices, all as more fully hereinafter described and claimed.

Figure 2:
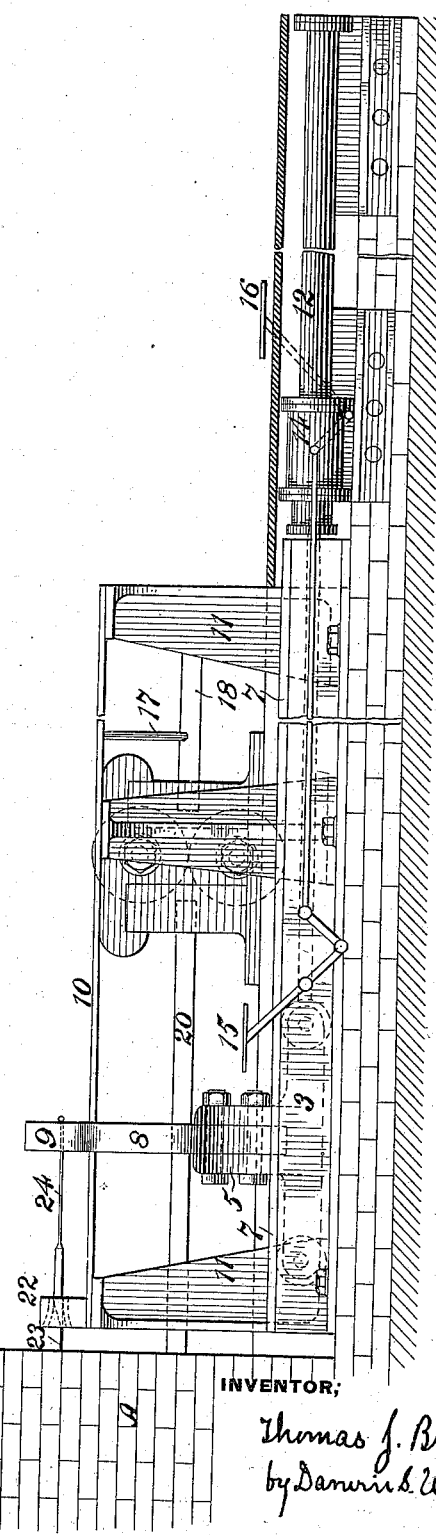

In the accompanying drawings, forming a part of this specification, Figure 1 is a plan view of a plant or apparatus embodying my invention. Fig. 2 is a side elevation of the same; and Fig. 3 is a sectional elevation on the line *x x*, Fig. 1.

In the practice of my invention I arrange a suitable bed or foundation, 1, in front of the ordinary or any suitable heating-furnace, A, and on this foundation I secure a bed-plate, 2, provided with longitudinal ribs or flanges 3, forming an inclosed track, 4, between them for the carriage 5. This carriage or buggy is provided with wheels 6, so as to facilitate its movement along the track 4, within which the buggy is retained by plates 7, bolted to the upper edges of the ribs or flanges 3 and projecting inwardly over the wheels 6. (See Fig. 3.) A bar, 8, securely fastened to the buggy or carriage, extends upward to a level with the door of the furnace, and is provided with a forked arm, 9, extending at an angle thereto, over an inclined plate or table, 10, supported by posts 11, secured to the bed-plate 2, alongside of the ribs or flanges 3. The bed-plate 2 and the table 10 are made of a length somewhat greater than the length of the pipe-sections to be formed, and the bed-plate is arranged in a pit or trench of such a depth that the flanges 3 will be below the floor-level of the mill. At the front end of the inclined table 10 is secured the head-block 22, having a conical opening therein for the reception of the bell-die employed for closing and welding the strip.

At the rear of the bed plate and in line therewith is placed a fluid-pressure cylinder, 12, of such a length that the movement of its piston shall be approximately the same as the length of the bed-plate or table. The front end of the piston-rod 13 is connected to the carriage or buggy 5. This cylinder is provided with a suitable valve mechanism, 14, for controlling the flow of fluid-pressure to and from the ends of the cylinder, said valve mechanism being operated to admit fluid-pressure to the front end and its escape from the rear end of the cylinder by a treadle, 15, located within convenient proximity of the front end of the bed-plate, and provided with suitable connections to the valve mechanism, and to permit the escape of fluid from the front end and its admission to the rear end of the cylinder by the treadle 16, located at or near the rear end of the bed-plate and having suitable connections to the valve mechanism.

The inclined table 10 is connected by similarly-inclined bars 17 to a trough, 18, located alongside of the draw-bench above described, and in such relation thereto that a pipe-section will roll down the table and bars to the trough as soon as released from the bell-die and drawing-hook. At the front end of the trough 18 is placed a pair of rolls, 19, having curved grooves formed therein, said grooves being so proportioned as to size and shape as to reduce a pipe-section passing between them to the desired external diameter. The rolls 19 are driven in any suitable manner, and behind them is arranged a receiving trough or plate, 20, alongside of which is arranged the cooling-table 21.

In operating the herein described apparatus the strips 23 are placed within the furnace A, the tag 24, which has been previously welded to the strip, being employed as a handle for that purpose. After the strip has been properly heated the bell-die is slipped over the tag, which is then dropped into the notch leading to conical opening in the head-block 22, and also into the fork in the arm 9, the buggy 5 having been previously moved to the front or furnace end of the draw-bench. The welder then places his foot on the treadle 15, depressing the same, and so shifting the valve mechanism 14 as to admit fluid-pressure into the front end of the cylinder 12 and open the exhaust-valve at the rear end thereof. The fluid-pressure thus admitted will, acting through the piston, pull the buggy quickly to the rear end of the draw-bench, thereby drawing the strip through the bell-die. As soon as the buggy reaches the rearward limit of its movement an operator stationed at the rear end of the bench disengages the tag from the forked arm 9, and then depresses the treadle 16 with his foot, thereby reversing the valve mechanism, admitting fluid-pressure to the rear end of the cylinder and permitting its escape from the front, whereupon the buggy is quickly shifted to the front end of the bench. As soon as the tag has been disengaged from the forked arm it will roll down the inclined bars 17 into the trough 18. The tag is then removed by sawing or otherwise, and the pipe fed to the grooved rolls 19, which, as before stated, reduce the pipe to the desired external diameter. After being thus reduced the pipe is rolled onto the cooling-table 21.

By properly proportioning the various ports of the cylinder and employing a comparatively high fluid-pressure the buggy 5 can be shot back and forth as rapidly as the welder can prepare and attach the strips thereto, as hereinbefore described.

The track for the carriage or buggy and the fluid-pressure cylinder are arranged below the floor-level in order to save valuable floor-room. If desired, the track or guideway 4 and the fluid-pressure cylinder may be arranged on a level, or approximately so, with the table 10, in which case the arm 8 would be dispensed with and the carriage or buggy could be mounted on guides, after the usual manner of mounting cross-heads. In some cases a lever or other equivalent device may be deemed more convenient than the treadle for operating the valve mechanism; hence I do not wish to confine myself to the use of a treadle for that purpose.

I claim herein as my invention—

1. In a pipe-welding apparatus, the combination of an inclined table, a welding-die located at the front end of said table, a reciprocating carriage or buggy provided with a forked arm extending over the table, and sizing-rolls for finishing and inclined bars for transferring the welded pipe from the table to a point in front of the sizing-rolls, substantially as set forth.

2. In a pipe-welding apparatus, the combination of a welding-die, a carriage or buggy provided with means for engaging the strip, a fluid-pressure cylinder and piston for operating the carriage or buggy, a valve mechanism controlling the admission and escape of fluid-pressure to and from the ends of the cylinder, and treadles located at or near the front and rear limits of the movement of the carriage or buggy for operating the valve mechanism, substantially as set forth.

In testimony whereof I have hereunto set my hand.

THOMAS J. BRAY.

Witnesses:
DARWIN S. WOLCOTT,
R. H. WHITTLESEY.